No. 832,501. PATENTED OCT. 2, 1906.
T. PENDERGAST.
PIPE COUPLING.
APPLICATION FILED APR. 17, 1905.
2 SHEETS—SHEET 1.
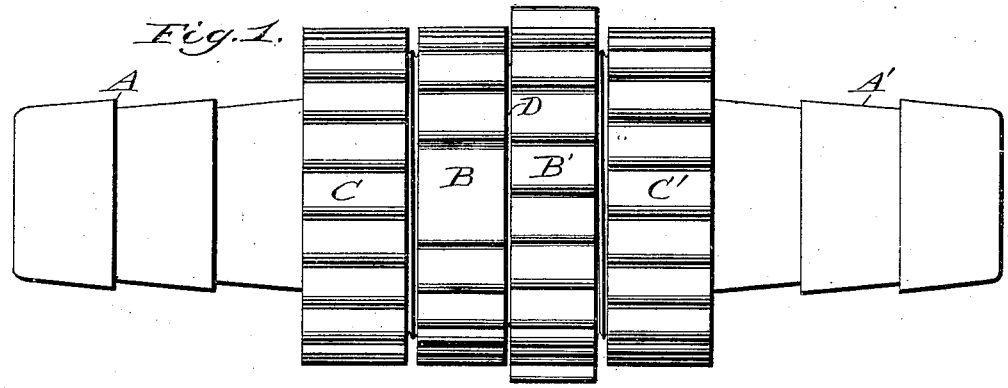
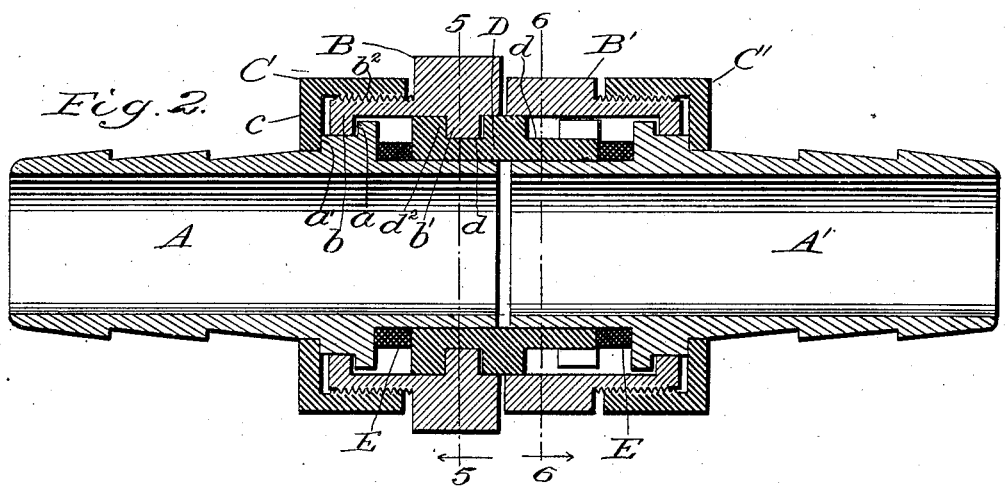
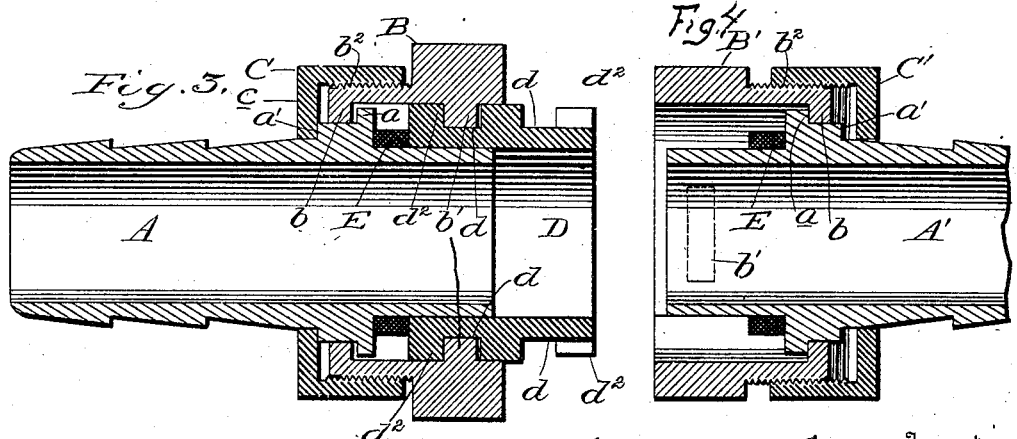
Witnesses
Inventor
Thomas Pendergast
By Julian C. Dowell ton
his Attorneys No. 832,501. PATENTED OCT. 2, 1906.
T. PENDERGAST.
PIPE COUPLING.
APPLICATION FILED APR. 17, 1905.
2 SHEETS—SHEET 2.
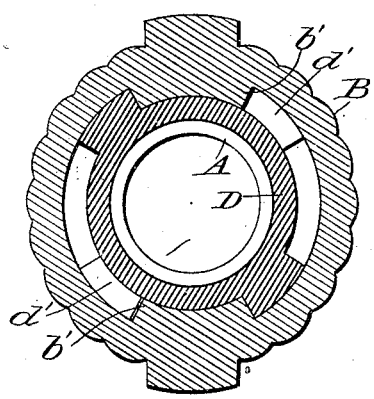
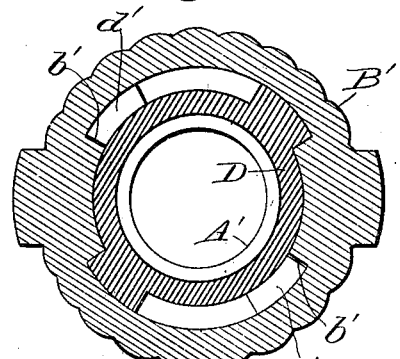
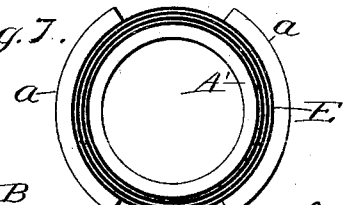
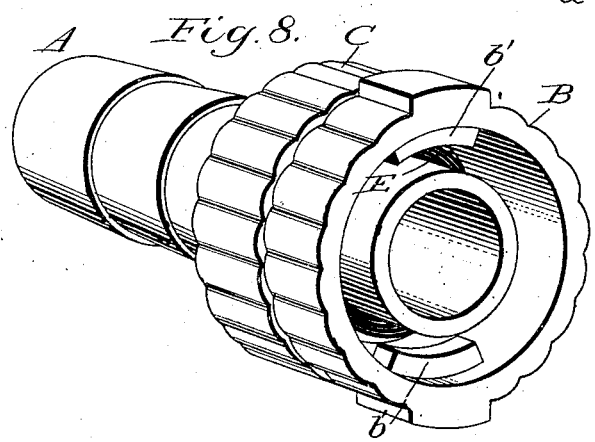
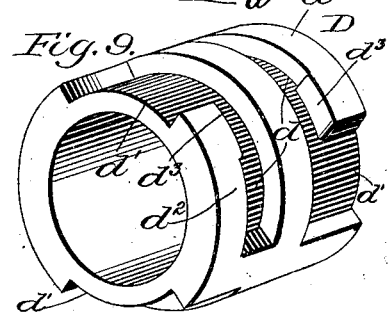
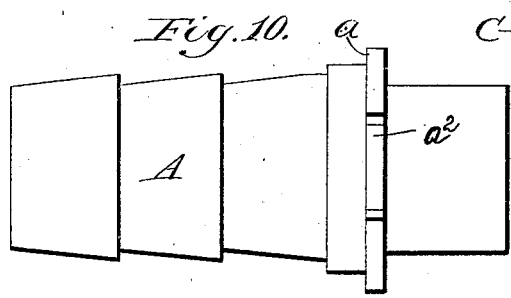
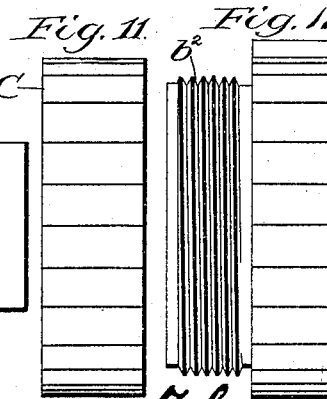
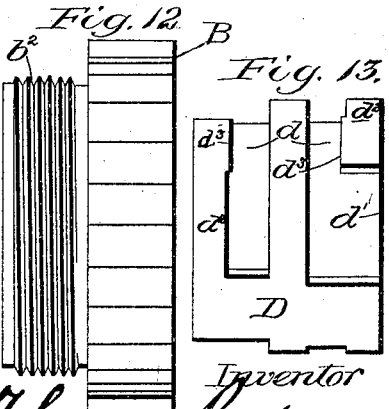
Witnesses
Inventor
Thomas Pendergast
By
his Attorneys

UNITED STATES PATENT OFFICE.

THOMAS PENDERGAST, OF LANCASTER, PENNSYLVANIA, ASSIGNOR OF FIFTY-ONE ONE-HUNDREDTHS TO JOHN HERTZLER, OF LANCASTER, PENNSYLVANIA.

PIPE-COUPLING.

No. 832,501.  Specification of Letters Patent.  Patented Oct. 2, 1906.

Application filed April 17, 1905. Serial No. 255,932.

*To all whom it may concern:*

Be it known that I, THOMAS PENDERGAST, a citizen of the United States, residing at Lancaster, in the county of Lancaster and State of Pennsylvania, have invented certain new and useful Improvements in Pipe-Couplings; and I do hereby declare the following to be a full, clear, and exact description of the invention, such as will enable others skilled in the art to which it appertains to make and use the same.

This invention is an improved detachable coupling designed especially for coupling pipes or hose intended to convey fluid under high pressure, such as train-pipes, fire-hose, &c.

The chief objects and advantages attained are, first, simplicity and efficiency of construction and great facility in coupling and uncoupling the parts; second, a perfectly fluid-tight joint; third, prevention of any possibility of accidental uncoupling, such as often results from turning or twisting of the pipes or hose-sections in handling them, and, fourth, in the preferred form of the invention, as illustrated, a unisexual or substantially identical construction of the united coupling members, adapting either member of a coupling for connection with either member of another coupling of the same kind and size, so that in a line of connected pipe-sections, as in train-pipes or fire-hose, either end of one pipe can be coupled with either end of the next pipe without the necessity of bringing the pipe-terminal carrying the male coupling member into juxtaposition with the pipe-terminal carrying the female coupling member. This latter feature obviates the common objection of non-interchangeability of the ends of pipe-sections coupled by means of some of the ordinary contrivances and renders the invention particularly useful for coupling train-pipes and fire-hose sections where the pipe-sections are frequently turned round about, such object being accomplished by a construction wherein the two coupling members carried by the adjacent pipe terminals or nipples are counterparts one of the other and both adapted to interlock with either end of an intermediary coupling member sleeved on the extremities of the said pipe terminals or nipples. The invention is not, however, limited to such construction in respect to the first three objects stated, as will hereinafter appear.

It may be added that for train-pipe service the invention is particularly advantageous, not only because of the capability of coupling whichever ends of the pipes may come together, but also because of safety and convenience in use, as hereinafter explained.

Without limiting myself to the specific construction illustrated, since modifications may be made in the details of structure and arrangement of parts, the invention will be first fully described with reference to the accompanying drawings, which form a part of this specification, and then more particularly pointed out and defined in the annexed claims.

In said drawings, Figure 1 is a side view of one preferred form of coupling embodying my invention. Fig. 2 is a central longitudinal section thereof. Fig. 3 is a central longitudinal section through one pipe-nipple and its coupling member, shown with the aforesaid intermediary member interlocked therewith. Fig. 4 is a view complementary to Fig. 3, showing the other pipe-nipple and its coupling member likewise in central longitudinal section. Fig. 5 is a vertical transverse section on line 5 5 of Fig. 2 looking in the direction of the arrow. Fig. 6 is a similar section on line 6 6 of Fig. 2 looking in the direction of the arrow. Fig. 7 is an end view of the inner end of one of the nipples. Fig. 8 is a perspective view of one of the nipples with its coupling member and nut. Fig. 9 is a perspective view of the aforesaid intermediary coupling member. Figs. 10, 11, 12, and 13 are assembled side views of a nipple, nut, coupling member, and intermediary uniting member.

A particular description of the illustrated construction is as follows:

The letters A A' indicate pipe terminals or tubular nipples adapted for insertion in or attachment to the ends of the pipes or hose-sections which are to be coupled together. Each of these nipples has external stepped flanges or shoulders *a* and *a'*, the former being in front of the latter and of larger diameter.

Surrounding the inner ends of the respective nipples are the female coupling members or sleeves B and B', having rear internallyprojecting flanges $b$, which fit loosely the nipples behind the shoulders $a$ thereof, so that the sleeves can swivel on the nipples. These coupling-sleeves slip onto the nipples over their outer ends, the abutment of the flanges $b$ against the shoulders $a$ limiting the inward movements of said sleeves. The coupling-sleeves have also front internal coupling-lugs $b'$, hereinafter referred to, and in order to permit said lugs to clear the shoulders $a$ as the coupling-sleeves are slipped over the nipples said shoulders $a$ are formed with notches $a^2$ of such size and arrangement as to allow the lugs $b'$ to pass through them. The said coupling-sleeves or female members B and B' preferably have their rear or outer ends reduced and are exteriorly threaded at $b^2$ for engagement by the nuts C and C', respectively. These nuts thus screw onto the coupling-sleeves, and they have rear interiorly-projecting flanges $c$, which fit loosely on the nipples behind the shoulders $a'$ thereof, against which said flanges $c$ abut. The said coupling-sleeves or female members B and B' are adapted for engagement with the opposite ends of an intermediary male member D, which is tubular or bored and sleeved on the contiguous ends of the nipples A and A'. Said member D is of appropriate external diameter to fit within the coupling-sleeves or female members B and B'. Packing-rings or rubber gaskets E E are fitted around the nipples between the flanges $a$ and the ends of the male member D, being compressed when the parts are coupled together. The interlocking connections between said intermediary male member and the female coupling members are in the nature of bayonet-joints. Each female member has the internal coupling-lugs $b'$, as aforesaid. One lug in each sleeve would answer; but for rigidity and steadiness two diametrically opposite lugs are preferred, as shown. Correspondingly each end of the male member is externally formed with segmental coupling grooves or slots $d$, extending transverse of the member in opposite directions from openings or slots $d'$ in end flanges $d^2$. The interlocking is effected by slipping the female member B or B' over the male member D, entering its lugs $b'$ through the openings or notches $d'$, and then turning the female member to lodge its lugs in the segmental grooves $d$, and thus interlock the parts, the flanges $d^2$ having thickened portions $d^3$ offset into the grooves $d$ adjacent to the openings $d'$, necessitating a forcible squeezing of the lugs $b'$ past said offset parts $d^3$ in order to lodge the coupling-lugs in the segmental grooves or slots $d$. After the female member B or B' is attached to the male member, the respective nut C or C' having been more less unscrewed to permit such attachment, then the nut is screwed up tight on the female member, which has the effect of drawing the coupling-lugs $b'$ tightly against the flange $d^2$ of the male member and also drawing the male member against the ring or gasket E and compressing it, thus making a fluid-tight joint between the nipple and the member D. Thereupon it is impossible to unlock the female member from the male member without first unscrewing or loosening the nut to allow sufficient projection of the female member, the thickened portions or offset $d^3$ necessitating a forcible squeezing of the coupling-lugs $b'$ past said offset parts, even though the nut be somewhat loose; but if the nut is tight it is of course absolutely impossible to unlock the parts.

The two coupling-sleeves or female members B B' are counterparts one of the other, and so likewise are the opposite ends or halves of the intermediary male member D. Consequently either end of D can be interlocked with either coupling-sleeve B or B'. This is a great advantage, since it allows each pipe-terminal to carry either a male or female coupling member, according to the coupling member of the other pipe-terminal which is to be coupled therewith.

To couple up two pipes or hose-sections provided with the devices described, the male member D is interlocked with the coupling-sleeve or female member of one pipe-terminal, as B, in the manner explained and secured by tightening its nut C. Then the coupling-sleeve or female member B' of the adjacent pipe-terminal is slipped onto the opposite or projecting end of the male member D and interlocked therewith and tightened in the same manner. The tightening of the nuts draws the two pipe-terminals or nipples A A' inward, and the two coupling-sleeves B B' outward, compressing the gaskets E and making a perfectly fluid-tight joint and providing an absolutely secure coupling, which cannot become unlocked except by unscrewing one or the other of the nuts C C' and turning and detaching the corresponding coupling-sleeve. To uncouple, either of the coupling-sleeves C or C' may be unlocked and detached after first unscrewing its nut, leaving the male member D projecting from the other coupling-sleeve. Hence it is obvious that in a line of connected pipe-sections, such as fire-hose and train-pipes, either end of any pipe-section can be coupled with either end of any other pipe-section, which is a great convenience where different ends of the pipes are presented for coupling. In railroading the cars or coaches are usually run back and forth on the line or route without turning, while the engines are turned on turn-tables or Y's. Hence the engine is frequently coupled to opposite ends of the same train or car. It is desirable for the engine to carry an extra male member D. Should its train-pipe be already provided with such a member, it may be coupled thereby to a female coupling of the adjacent train-pipe; but if neither of the coupling members happen to have such male part then the extra member may be utilized.

As a train-pipe coupling my device is also advantageous for its convenience and safety. It is not necessary for the trainman to get under between the cars; but he may simply extend his arm and with one hand loosen up one of the nuts and turn the corresponding coupling member to couple or uncouple.

From the foregoing explanation it is seen that the device illustrated provides a twofold means of coupling and uncoupling; but with respect to the first three objects, primarily stated, the invention is not limited to such double construction, since for a single coupling the male part D might obviously be a permanent member of one pipe-terminal adapted for interlocking with a female member of another terminal.

Having thus fully described my invention, what I claim as new, and desire to secure by Letters Patent of the United States, is—

1. In a pipe-coupling, the combination of a pipe-terminal, a female coupling member surrounding the same, a revoluble nut on said pipe-terminal having a threaded engagement with said female coupling member, and a coöperative male coupling member adapted to slip over the end of said pipe-terminal within said female coupling member and having an interlocking connection with said female member, said female member having internal coupling-lugs, and said male member having coöperative external segmental grooves disposed transversely and having openings to admit said coupling-lugs and allow them to pass into said grooves.

2. In a pipe-coupling, the combination of a pipe-terminal carrying a rotatable or swiveled female coupling member, and a coöperative tubular male coupling member for an adjacent pipe-terminal having an interlocking connection with said female coupling member and also adapted to sleeve onto the extremity of said first-mentioned pipe-terminal, a packing-ring arranged around the pipe-terminal against an external shoulder thereon and adapted to be compressed between said shoulder and the end of said male member when the latter is sleeved onto said pipe-terminal, and a nut revolubly mounted on said pipe-terminal having a flange abutting behind an external shoulder on said pipe-terminal and having a threaded engagement with said female member, substantially as described.

3. In a pipe-coupling, the combination of a pipe-terminal having an external shoulder $a$, a revoluble coupling-sleeve or female member thereon having an internal flange adapted to abut against or behind said shoulder, said coupling-sleeve having an internal coupling-lug, a revoluble nut swiveled on the pipe-terminal and having a threaded engagement with said coupling-sleeve, and a tubular male coupling member for an adjacent pipe-terminal adapted to sleeve onto said first-mentioned pipe-terminal and having an interlocking connection within said coupling-sleeve, said male member having an external segmental slot and an opening in the outer wall or end flange thereof to receive said coupling-lug and allow the same to lodge into said slot behind said flange when the coupling-sleeve is turned.

4. In a pipe-coupling, the combination of a pipe-nipple having an external shoulder, a revoluble coupling-sleeve or female member thereon having an internal flange behind said shoulder, said coupling-sleeve having internal coupling-lugs, the said shoulder on the pipe-nipple having notches to allow passage of said lugs when the coupling-sleeve is slipped over the end of said nipple, a revoluble nut on said nipple behind said coupling-sleeve having a threaded engagement with said coupling-sleeve, said nut having an internal flange engaging behind another and smaller shoulder on the pipe-nipple, a gasket or packing-ring surrounding the pipe-nipple in front of the first-mentioned shoulder thereon, and a tubular male coupling member adapted to sleeve onto the end of said pipe-nipple and to fit within said coupling-sleeve, said male member having external coupling-grooves coöperative with the coupling-lugs of the coupling-sleeve or female member.

5. In a pipe-coupling, the combination of adjacent pipe-terminals carrying female coupling members swiveled on said pipe-terminals, and an intermediary tubular male coupling member adapted to sleeve onto the extremities of said pipe-terminals and having an interlocking connection with said female members, substantially as described.

6. In a pipe-coupling, the combination of adjacent pipe-terminals carrying female swivel coupling members or sleeves, and an intermediary tubular male coupling member adapted to sleeve onto the extremities of said pipe-terminals and fit within said female coupling members and having an interlocking connection with said female members, and revoluble nuts swiveled on said pipe-terminals having a threaded engagement with said female coupling members for positively locking them to said intermediary member, substantially as described.

7. In a pipe-coupling, the combination of adjacent pipe-terminals each carrying a rotatable female coupling member, a tubular male coupling member adapted to sleeve on the ends of said terminals and adapted for interlocking connection with both of said female members, said pipe-terminals having external shoulders, packing-rings on said pipe-terminals adapted to be compressed between said shoulders and the ends of said male member, and revoluble nuts on said pipe-terminals held against endwise movement and having threaded engagement with the respective female members, substantially as described.

8. In a pipe-coupling, the combination of adjacent pipe-terminals, each carrying a rotatable coupling-sleeve and a swiveled nut having a threaded engagement with said sleeve, an intermediary male coupling member adapted to sleeve onto the ends of both pipe-terminals and to fit within both coupling-sleeves, said coupling-sleeves having internal coupling-lugs, and the opposite ends of said male member having coöperative external coupling-grooves comprising segmental slots with openings in the end walls or flanges thereof arranged to admit the coupling-lugs into said slots, the said end flanges or outer walls of the said slots being inwardly offset adjacent to said openings to require a forcible squeeze of the coupling-lugs therepast.

In testimony whereof I affix my signature in presence of two witnesses.

THOMAS PENDERGAST.

Witnesses:
   REDMOND CONYNGHAM,
   CHAS. W. EOLEY.